(12) United States Patent
Clark

(10) Patent No.: US 6,776,349 B1
(45) Date of Patent: Aug. 17, 2004

(54) DAMPER FOR CONTROLLING AIR FLOW THROUGH A PASSAGE

(76) Inventor: Thomas L. Clark, 2809 Rio Branco #102-D, Dallas, TX (US) 75234

( * ) Notice: Subject to any disclaimer, the term of this patent is extended or adjusted under 35 U.S.C. 154(b) by 0 days.

(21) Appl. No.: 10/691,214

(22) Filed: Oct. 22, 2003

Related U.S. Application Data

(60) Provisional application No. 60/420,649, filed on Oct. 23, 2002.

(51) Int. Cl.[7] ........................... F23L 17/10; G05D 23/08
(52) U.S. Cl. ........................... 236/49.5; 454/18; 454/31; 454/352
(58) Field of Search ............................ 454/18, 19, 31, 454/351, 352, 363; 236/49.5

(56) References Cited

U.S. PATENT DOCUMENTS

| | | |
|---|---|---|
| 1,663,199 A | 3/1928 | Hirschman |
| 2,963,956 A * | 12/1960 | Hill ............................ 454/352 |
| 2,965,014 A | 12/1960 | Lowery |
| 3,107,598 A | 10/1963 | Rudy |
| 3,436,016 A | 4/1969 | Edwards |
| 3,521,546 A * | 7/1970 | Day ........................... 454/313 |
| 3,976,245 A | 8/1976 | Cole |
| 4,017,026 A | 4/1977 | Felter |
| 4,123,001 A | 10/1978 | Kolt |
| 4,290,554 A | 9/1981 | Hensley |
| 4,372,485 A | 2/1983 | McCabe |
| 4,416,415 A | 11/1983 | Kolt |
| 4,501,389 A | 2/1985 | Kolt |
| 4,582,250 A | 4/1986 | Kolt |
| 4,587,706 A | 5/1986 | Prikkel et al. |
| 4,697,736 A | 10/1987 | Kolt |
| 4,715,532 A | 12/1987 | Sarazen et al. |
| 4,754,696 A | 7/1988 | Sarazen et al. |
| 4,919,329 A | 4/1990 | McCabe |
| 4,962,882 A | 10/1990 | Sarazen et al. |
| 5,183,435 A * | 2/1993 | Galvez ........................ 454/18 |
| 5,253,804 A | 10/1993 | Sarazen et al. |
| D347,471 S | 5/1994 | DeHerrera |
| 5,957,373 A | 9/1999 | Sarazen et al. |
| 5,984,196 A | 11/1999 | Godsey et al. |

* cited by examiner

Primary Examiner—Harold Joyce
(74) Attorney, Agent, or Firm—Drude Faulconer

(57) ABSTRACT

A damper for allowing some degree of air flow (winter ventilation) through a roof mounted, conduit to aid in preventing the growth of black mold in an attic while aiding in heat retention during colder periods of the year. The low profile damper is comprised of a housing having a plurality of louvers pivotably mounted therein. A linkage strip interconnects the louvers together whereby a bimetal coil move the louvers in unison between their open and closed positions in response to temperature. The damper includes an air flow selector means that allows a "selected" closed position to be selected at which a predetermine volume of air is allowed to flow through the damper.

20 Claims, 6 Drawing Sheets

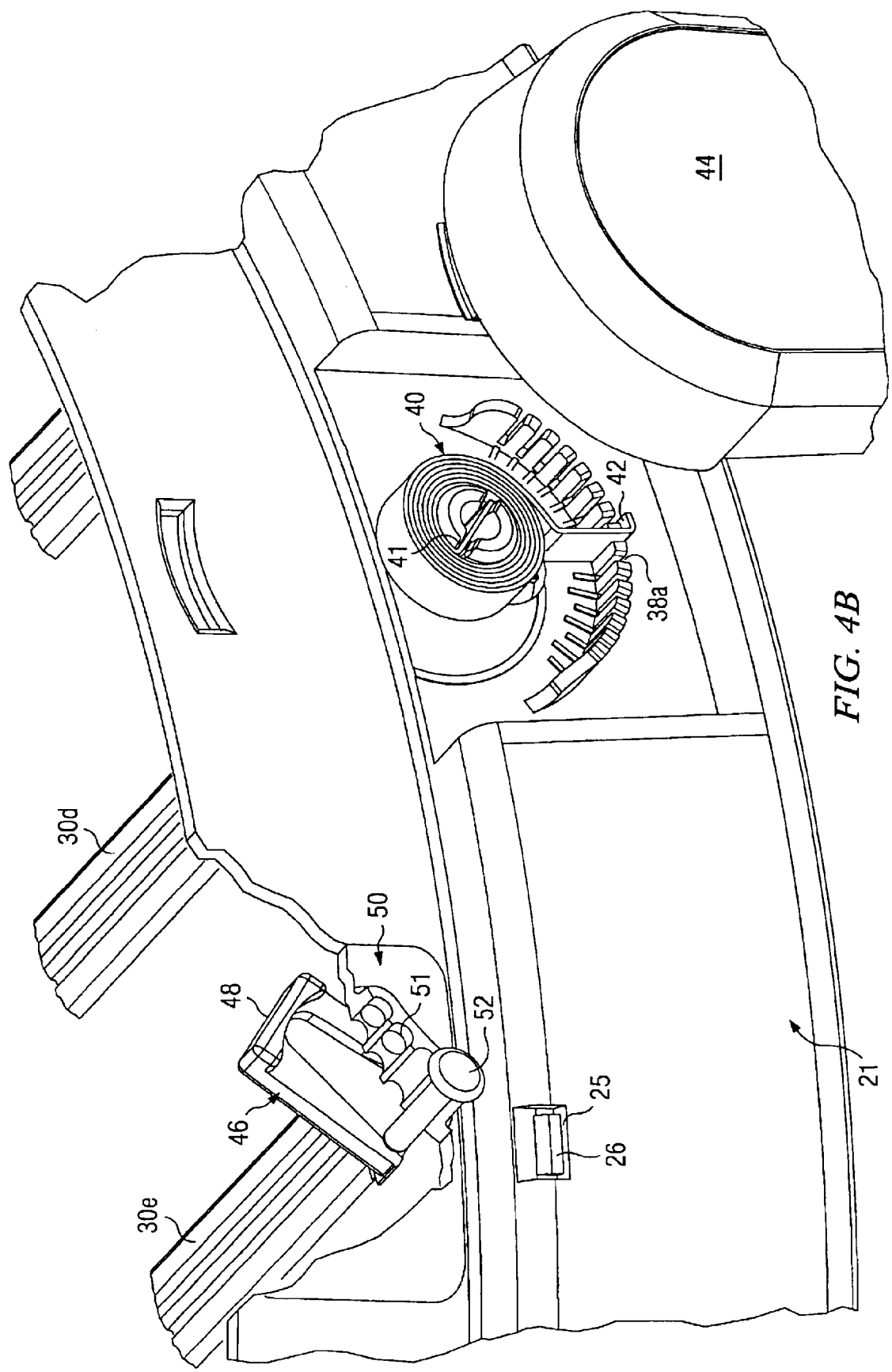

DAMPER FOR CONTROLLING AIR FLOW THROUGH A PASSAGE

CROSS-REFERENCE TO EARLIER APPLICATION

The present application claims the priority of U.S. Provisional Application No. 60/420,649, filed Oct. 23, 2002.

DESCRIPTION

1. Technical Field

The present invention relates to a damper for controlling the flow of air through a passage and more particularly relates to an temperature responsive, automatic damper particularly useful with a wind-powered, roof-mounted turbine attic ventilator, the damper having means for controlling air flow through the damper when the damper is in an otherwise "closed" position.

2. Background of the Invention

Most confined spaces such as the attic of a house, building, etc. must be ventilated during the warmer periods of the year in order to prevent excessive heat buildup therein. That is, the attic of a house, if unventilated, can reach extremely high temperatures during the summer months in most areas. This retained heat normally results in substantially higher costs for cooling the building and can lead to other maintenance problems. While there are various means for ventilating these spaces, probably the most common and widely used is the roof mounted, wind-powered turbine ventilator, especially in warmer climates.

In a typical installation, the wind turbine is mounted onto a conduit which, in turn, is fixed over an opening cut through the roof of the structure. The wind causes the turbine blades to rotate which creates a suction which, in turn, draws air from the space below the roof (e.g. hereinafter referred to as "attic"), through the conduit, and out through the spinning turbine.

Such turbines are highly effective in exhausting hot air from attics during the hot periods of the year. Unfortunately, these turbines also continue to remove relatively warm air from the attic during colder periods which, in turn, is replaced with frigid, ambient entering the attic through the structure's under eave sofit vents. As easily recognized, this is not good since the temperature in the attic can drop to extremely low levels which, in turn, can adversely affect the desired heating of the structure during these cold periods. That is, if the temperature in the attic becomes too cold, the heating system in the structure may not be able to adequately heat the structure and, at the very least, can lead to substantially higher energy usage and heating costs. Accordingly, it has long been recognized that it is desirable to block airflow through these turbines during the colder months of the year.

There are several known techniques for controlling the airflow through roof-mounted turbines during high and low temperature cycles. Probably the simplest way to conserve attic heat in the winter is by externally securing a cover (e.g. plastic trash bag) over the turbine during the colder periods, thus stopping airflow through the turbine. Such deployed plastic bags are unsightly and require the installer to crawl onto the roof which can be dangerous.

Another technique is to manually force a "plunger-like" compressible stopper into the ventilation conduit to block substantially all of the air flow through the ventilation conduit during colder periods. This technique is unreliable and inconvenient since it require a person to physically crawl through the attic at the appropriate times of the year to place and remove the stopper from the ventilation conduit.

A more sophisticated, known technique involves positioning an "automatic" damper in the ventilation conduit between the turbine and the opening through the roof. These dampers are designed to move between (a) a fully "open" position when the ambient temperature rises above a set value (e.g. 80° F.) to allow maximum air flow through the turbine and (b) a fully "closed" position when the temperature drops below the set value to block substantially all air flow through the ventilation conduit.

Most known, prior art automatic dampers of the type used with roof-mounted turbine ventilators have two or more vanes or louvers that are pivotally mounted in a housing. The louvers are moved between their open and closed positions by a means (e.g. a bimetal element such as a coil, spring, etc.) which, in turn, is responsive to the ambient temperature. For examples of such known dampers, see U.S. Pat. Nos. 3,976,245; 4,123,001; 4,372,485; 4,582,250; 4,697,736; and 4,919,329.

While some of these types of automatic dampers have achieved varying degrees of commercial success, it is considered that there are certain disadvantages associated therewith. A major disadvantage is that dampers of this type normally have only a fully open position which allows maximum air flow during hotter periods and a fully closed position which substantially blocks all of the air flow during colder periods. While such dampers may be ideal when considering only the heating and cooling of a structure, other concerns relating to confined spaces such as attics have arisen which make the use of such dampers less attractive.

That is, in a totally closed, non-ventilated attic, moisture is likely to collect during the colder months which, in turn, can readily provide a "breeding ground" for "black mold" and like growths. As has been well advertised, the presence of black mold in residences and other structures has become a serious problem creating hazardous health conditions and requiring thousands of dollars to rectify. In fact, the problem of mold recently has grown to such an extent that many insurance companies no longer offer coverage in many areas.

Another disadvantage of these known dampers is that the dampers are not interchangeable between the particular ventilating conduits presently available from several different manufacturers. That is, even if it may be possible to retrofit a previously installed conduit with a damper, a specially designed damper for that respective conduit would be required. This prevents a supplier from stocking a single, universal damper that would be usable with most presently available ventilation conduits.

Further, due to the widths of the louvers of the known dampers, most, if not all, of these dampers can not be retrofitted into certain existing ventilation conduits such as those required for mounting a turbine onto highly pitched roofs. These limitations seriously affect the commercial exploitation of an automatic damper that can be easily and quickly installed into almost all-existing ventilation conduits as a retrofit by an unskilled craftsman.

Still further, previous automatic dampers that have been proposed for use with wind-powered, roof top ventilators have not lent themselves to low cost, fast assembly or mass production. Typically, they require several punched metal parts that are held together by many rivets, screws and nuts and most exhibit many metal-on-metal wearing surfaces. A typical, prior art damper has components that are prone to wear out easily and get out of adjustment causing it to have a very limited life. Additionally, most require a thick and expensive bimetal coil to lift their heavy metal louvers. Also, the mechanical action for moving the louvers of these dampers is somewhat complex and prone to an early failure.

SUMMARY OF THE INVENTION

The present invention provides a damper for controlling air flow through a passage wherein the damper is capable of allowing some degree of ventilation while, at the same time, blocking the majority of the air flow through the damper. The damper is especially useful in controlling air flow through ventilation conduits used to mount air turbines on the roof of a structure wherein the damper opens during warm periods of the year and then moves towards a closed position during colder periods. By allowing some "winter ventilation" for attics and the like, the damper is beneficial in preventing an atmosphere within the attic which can support the growth of black mold, etc. but at the same time can block the majority of the air flow from the attic during the winter to thereby aid in retaining heat in the structure which, in turn, saves energy and the costs related thereto.

More specifically, the present invention provides a damper which has a means which selects a "closed" position for the damper to allow a desired amount of air to flow therethrough (i.e. winter ventilation) when the damper is in this selected closed position. In a preferred embodiment, this means allows several different positions (e.g. between from about 0% to about 25% of maximum flow) to be selected depending on the needs and location of the user.

Basically, the present invention provides a low profile damper that is comprised of a housing having a plurality of louvers pivotably mounted therein. A linkage strip interconnects the louvers together so that all of the louvers move in unison between their open and closed positions. Preferably, the housing, louvers, linkage, and retainers for the louvers are molded from plastic whereby no metal fasteners and like with be required.

A temperature responsive element, e.g. bimetal coil, is directly connected between the housing and one of the louvers and moves the louvers to their open position when the ambient temperature heats up and moves the louvers toward their closed position when the weather cools.

In the preferred embodiment, the air flow selector means is comprised of a plurality of openings or a continuous slot which extend through the housing and are adapted to receive a detent which, in turn, will extend through the selected opening or the slot and into the arcuate path of at least one of the louvers. The positioning of the detent within a particular opening or at a particular point in the continuous slot will determine the degree of winter ventilation which is to be provided by the damper in that the louver will contact the detent as the louvers are being rotated towards their closed positions and will stop at the selected closed position of the damper.

It is recognized that while an universal, adjustable damper may be preferred by many since such a damper can be adjusted to the particular climate in which it is to be used. That is, where the temperature is "warm" during the winter and the humidity and moisture content is high, the damper would most likely be set at its highest setting (e.g. 25% flow rate). Conversely, in extreme cold and/or dry climates, the damper is likely to be set at its minimum setting (about 0%).

However, where the winter climate is basically constant, year to year, a user may prefer a "factory preset" damper which moves between a fully open position and a single selected closed position. In accordance with the present invention, the air flow selector means of one embodiment comprises gaps between adjacent louvers and/or openings or slots in one or more louvers which, when the louvers are in their selected closed position allow a predetermined amount of air to flow through the damper. In another embodiment, interference means, e.g. stops on at least one louver, are provided which block further rotation of the louvers when they reach their selected closed position.

BRIEF DESCRIPTION OF THE DRAWINGS

The actual construction operation, and apparent advantages of the present invention will be better understood by referring to the drawings, not necessarily to scale, in which like numerals identify like parts and in which:

FIG. 4B is a partial perspective view similar to FIG. 4A but showing a different means for affixing one end of the bimetal coil to the housing;

While the invention will be described in connection with its preferred embodiments, it will be understood that this invention is not limited thereto. On the contrary, the invention is intended to cover all alternatives, modifications, and equivalents that may be included within the spirit and scope of the invention, as defined by the appended claims.

DESCRIPTION OF THE PREFERRED EMBODIMENTS

Figure 1:
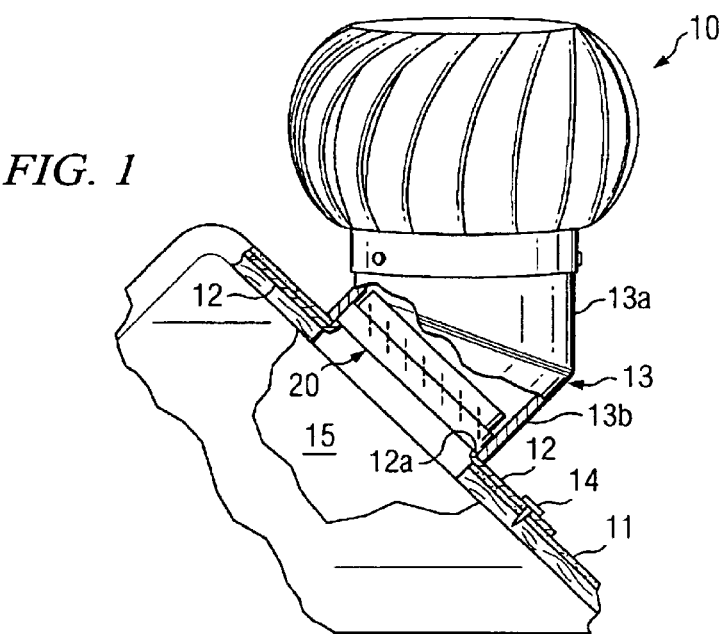
FIG. 1 is a perspective side view, partly in section, of a typical wind turbine/ ventilation conduit installation on a roof into which the damper of the present invention can be initially installed or retrofitted.

Referring more particularly to the drawings, FIG. 1 illustrates a typical installation of a wind turbine ventilator 10 mounted on a roof 11 of a structure, e.g. house. As will be understood in the art, the upper portion of mounting base or flange 12 of ventilation conduit 13 is slid under the shingles (unnumbered) and secured while the lower portion of the flange is secured to the top of the shingles (not shown) by nails 14 or the like. As illustrated, conduit 13 is representative of many commercially-available conduits which are capable of accommodating turbine installations on a wide range of pitched roofs, including highly sloped roofs, e.g. a 12/12 pitch. For reference, standard pitches for roofs range from 3/12 at 14 degrees of slope to 12/12 at 45 degrees of slope. The most popular size of turbine ventilators now in use is made to fit onto a cylindrical ventilation conduit 13 having a 12-inch diameter; followed in popularity by turbines designed to fit onto conduits having a 14-inch diameter.

Universal ventilation conduits such as conduit 13 are generally made of stamped sheet steel or aluminum. To accommodate a particular roof pitch or slope, a typical conduit 13 is made in cylindrical sections 13a, 13b having tapered surfaces that are rotatably connected together. The final position of conduit 13 is adjusted by rotating the top section 13a while the bottom section 13b is held stationary on flange 12. As will be understood in the art, the relative rotation of the abutting tapered surfaces of the conduit sections allows the final positioning of conduit 13 to accommodate the slope of almost any conventional roof while providing a relative horizontal mounting surface for the rotary ventilator. This allows the turbine to be gravitationally balanced and to spin freely on its spindle for maximum efficiency.

Adjustable roof mounted conduits 13, such as described above, and their corresponding turbine ventilators 10 are well known and are commercially available from several different sources; e.g. GAF, Inc. of Atlanta, Ga.; CertainTeed, Inc of Dallas, Tex.; Lomanco, Inc. of Jacksonville, Ariz. and M&M Manufacturing Company, Ft. Worth, Tex.

Referring again to FIG. 1, a damper 20, in accordance with the present invention, is positioned with conduit 13 to control the air flow through the conduit. In its placement, damper 13 is merely manipulated down through the conduit 13 and freely comes to rest on top of a shoulder or inner circumferential flange 12a which is normally present on the mounting flange 12 of present commercially-available ventilator conduit packages. The damper 20 can be put into position at the time the conduit 13 is originally installed or the damper can be installed as a retrofit by merely removing turbine 10, positioning the damper into the conduit, and then replacing turbine 10 onto the conduit.

Damper 20 of the present invention is capable of allowing maximum flow through conduit 13 when the damper is in its fully open position and is capable of being set to permitting air flow of between 0% and about 25% or more of its maximum flow when the damper is in its closed position. As discussed above, this allows the damper to be moved towards its closed position during colder periods to block the majority of air flow from the attic 15 (FIG. 1) under roof 11 to aid in the heat retention within the structure but, at the same time, allowing some flow to continue during these periods to prevent collection of moisture and potential mold growth in attic 15.

Figure 2:
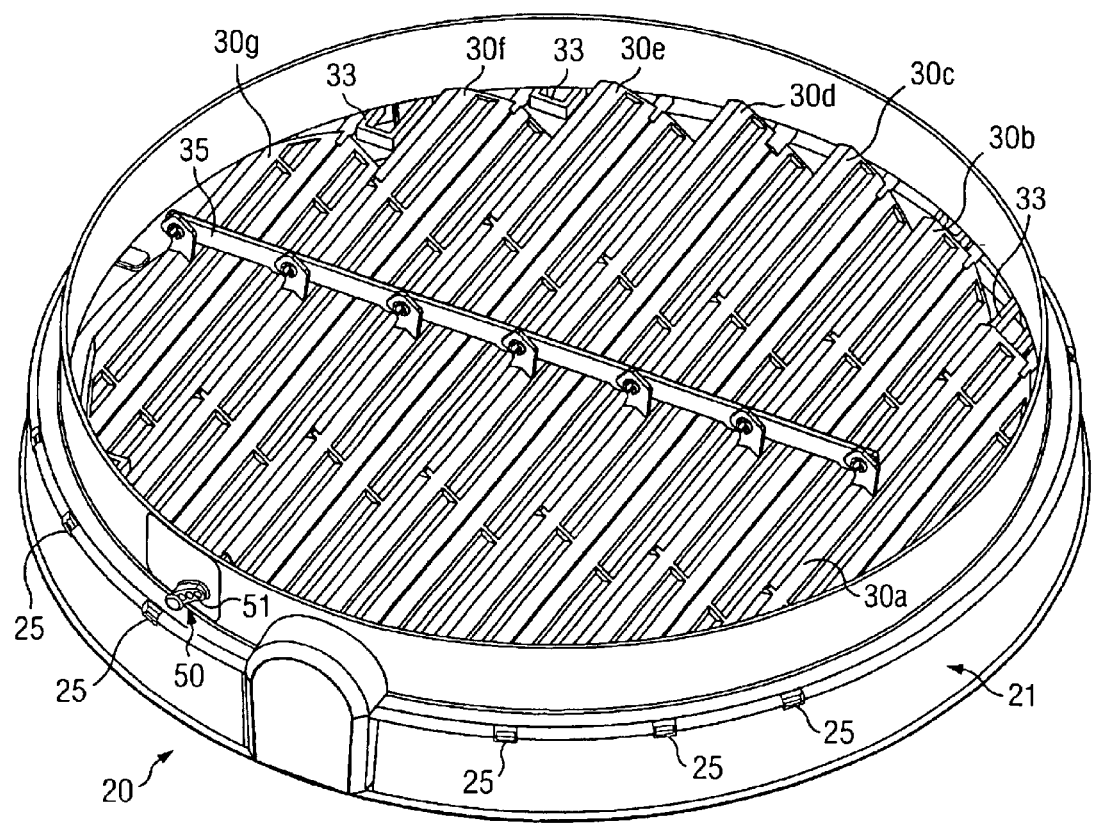
FIG. 2 is a perspective view of the damper of FIG. 1.
Figure 3:
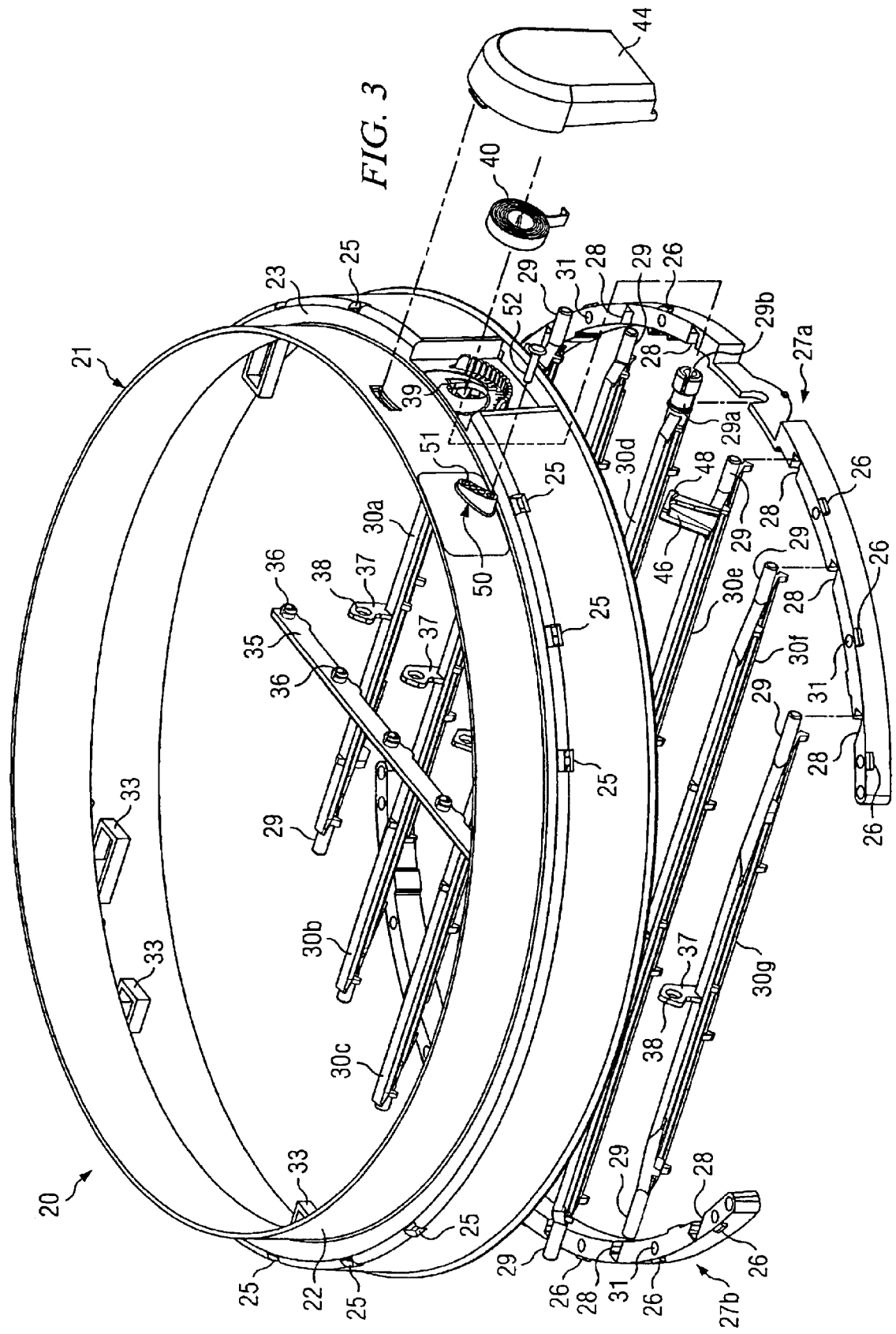
FIG. 3 is an enlarged, exploded view of the damper of FIG. 1.
Figure 4A:
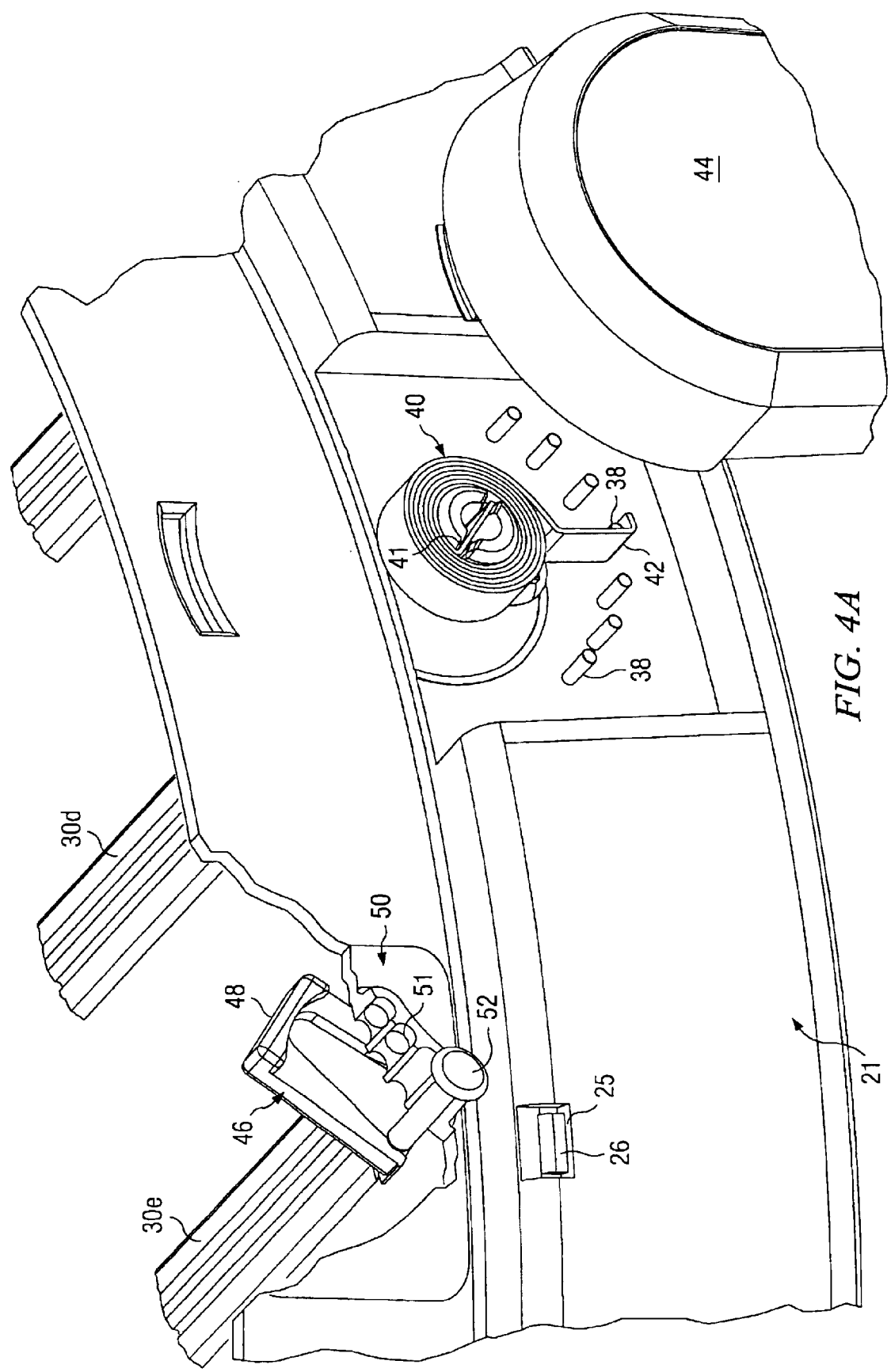
FIG. 4A is a partial perspective view of the damper of FIG. 1 broken away to illustrate a means for adjusting the louvers of the damper in various selected closed positions which allow different amounts of ventilation therethrough when said damper is said respective selective closed positions and to show means for affixing one end of the bimetal coil to said housing.

More specifically, FIGS. 2–4 discloses the preferred embodiments of the damper in accordance with the present invention. While the various components can be made utilizing various materials and methods, such as die stamping of sheet steel or aluminum, it is preferred that all of the components are made of resilient plastic, e.g. polypropylene. These plastic components can be made via injection molding having a low coefficient of friction, well suited for bearing surfaces and pivotal unions, and have integrally formed interlocking latch features that preclude the need for separate fasteners such as metal fasteners which can rust and erode.

Referring now to the exploded view of FIG. 3, damper 20 is comprised of a cylindrical, stepped housing 21 having a upper, vertical cylindrical wall 22 and a lower, cylindrical vertical wall 24, with an integral, relatively horizontal step 23 connecting the two. The two different diameter configuration of the housing allows a plurality of dampers 20 to be stacked in a nesting relation one on the top of another which, in turn, can save up to 30 to 45% of the space required to store the same number of other dampers. This can result in savings to the manufacturer and ultimately to the consumer.

A plurality of latch slots 25 are radially spaced around the step 23 which are adapted to receive latches 26 that, in turn, are formed around the periphery wall of the molded plastic, retainers 27a, 27b. Also, formed in the top surface of each retainer 27a, 27b are slots or troughs 28 that are spaced to receive the pivot or axle pins 29 that, in turn, are formed (molded) on each end of each louver 30a–g. Pivot pins 29 provide the respective axle about which each louver rotates.

To assemble damper 20, each pivot pin 29 of louvers 30 is loosely positioned within its respective trough 29 in respective retainers 27a, 27b so that each louver is free to rotate therein. As each louver is so positioned, care is taken to see that the longer and shorter louvers are arrayed in their proper sequential order with louvers numbering from 30a–g (see FIG. 1). The housing 21 is then lowered over the retainers 27a, 27b and latches 26 on the retainers enter into their respective latch slots 25 on the housing 21. As the outer edge of a latch 26 moves into its slot 25, a locking engagement is effected by the latch first being biased slightly inward as it moves into the housing and then snapping back when it is fully in slot 25.

Latches 26 may be guided into their respective slots 25 by a plurality of guide members (e.g. pegs or the like, not shown) on the under side of step 23 that, in turn, are received into precisely molded corresponding, guide holes 31 (only some numbered for clarity) formed in the retainers 27a, 27b. When the pivot retainers are latched into the housing 21, the louvers 30 are now pivotably mounted in the housing, thereby allowing the louvers to move within a respective arc between their open and closed positions.

It should be recognized that in some instances, damper 20 could be made without separate retainers 27a, 27b. That is, the louvers 30a–30g could be directly inserted into slots in the housing 21, entering either from the top or the bottom, and held in place by their axle pins 29 which, in turn, may be pressed into the housing. Alternately, holes or slots (not shown) may be formed into the housing whereby the louvers are distorted while the axle pins of the louvers are so positioned and then released to return to their normal configuration to spring lock the louvers in place.

While recognizing that louvers 30a–g may be substantially flat surfaced, preferably they are "ruffled", or somewhat corrugated as shown in FIG. 2. The ruffled designed louvers have more column strength and are much more resistant to sag even though the louvers are suspended from their ends. As seen in the drawings, the length of the louvers varies according to where each is positioned within circular housing 21. Since each louver 30 is linear and their respective pivots (axle pins 29) lie on the centerline of the louver and since the louvers lies within a cylindrical housing, the lifting sides of louvers 30a–c are pivotally moving into wider spaces while the lifting sides of the other louvers 30e–g are pivotally moving into narrower spaces.

For this reason, louvers 30a, 30b, 30f, and 30e abut mini-air gap elements 33 that are molded on the inner periphery of housing 21. These elements are so arranged that none of the louvers 30 will bind against the inside of the housing 21 as the louvers move between their open and closed positions. Note that when the louvers 30 of damper 20 are in the closed position, adjacent louvers slightly overlap so that there will be substantially no air flowing between the closed louvers. Air gap elements 33 also provide mini-air passages to prevent the louvers 30 from fluttering noisily when damper 20 is in a fully closed position should a "back draft" occur across the damper.

An elongated, linkage strip 35 interconnects louvers 30 so that when strip 35 is moved substantially horizontally within the housing 21, all of the louvers will be rotated between their open and closed position. Preferably, linkage strip 35 has a plurality of integrally formed, tapered split-headed connectors 36 (only some numbered for clarity) spaced along the longitudinal axis thereof. Each connector 36 is adapted to be received through a respective opening 37 in an arm 38 (only some numbered for clarity) which, in turn, is integrally formed on the upper surface of a respective louver 30. To assemble the linkage, the head of each connector 36 is compressed as it forced through its respective opening 37. When the compressed connectors pass completely through their respective openings, they spring back to their original position thereby locking the louvers to the linkage 35 in a rotatable relationship.

While it should be recognized that the number of louvers may vary in some applications, damper 20, as illustrated, is comprised of seven louvers. The axle pin 29a on one end of the middle louver 30d (hereafter called "master louver") extends through opening 39 in housing 21 and has a slot therein for directly connecting the master louver 30d to a bimetal coil actuator 40. As the coil actuator 40 expands or contracts in response to temperature, it will rotate the master louver 30d which, in turn, will rotate all of the other louvers in unison through interconnecting strip 35.

Helical, bimetal coil actuator 40 can be the type commonly used in well known thermostats that react to ambient temperature changes by expanding and contracting. It is this movement of coil 40 that drives the louvers 30 between their open and closed positions. More specifically, the inner end 41 of coil 40 is positioned within the slot 29b on axle 29a while the outer end 42 of the bimetal coil actuator 40 is gripped by one of a plurality of pegs 38 (FIG. 4A) or slots 38a (FIG. 4B) that are molded on the housing 21. These spaced pegs or slots form a means for adjusting the range of movement of linkage strip 35 within housing 21. This gives the assembler of damper 20 an option as to which peg 38 or slot 38a to use in order to "fine tune" a particular coil 40 being installed to thereby compensate for variations normally present in commercially-available bimetal coils of this type.

With the outer end of the bimetal coil 40 so anchored to the housing 21, the inner end of the coil is free to convey all motion of coil's expansion and contraction directly to the master louver through its engagement with axle pin 29a on the master louver 30d. After the coil 40 is in place, the coil cover 44 is pressed into the housing 21, covering the coil 40 and the coil adjustment means 38.

It should be noted that the axle pins 29 are in the longitudinal center of the each of their respective, relatively narrow louvers 30, thereby providing a "low profile" damper, which is considered an important feature of the present invention. "Low profile" as used throughout the present specification and claims is intended to mean a damper wherein all portions of both the louvers 30 and the interconnecting linkage strip 35 remain within the profile of the rigid damper housing 21 at all times, whether the damper is open or closed. That is, even when in full open position, no part of any of the louvers or of the strip 35 will extend above or below the top or bottom of housing 21. This allows the louvers to lie completely within and to be protected by the housing at all times which, in turn, allows damper 20 to be transported safely during the warm months when the coil 40 is normally expanded and louvers 30 are open without risking damage to the louvers, coil, or the connecting linkage strip.

Another important feature of the damper 20 of the present invention is its airflow selector means 50. This feature gives the user the option of selecting varying degrees of air flow through the damper even when the damper is in an otherwise "closed position", i.e. the position of damper 20 when it desired to block substantial amounts of air flow from attic 15 during the colder periods of the year. As discussed above, if the damper is completely closed and the attic is unventilated, the humidity in attic 15 can cause moisture to accumulate thereby providing a favorable environment for the growth of black mold and the like. Accordingly, it is desirable to be able to provide some ventilation from the attic at all times, even during colder periods but at the same time limit the air flow to aid in heat retention during these periods.

As shown in FIGS. 2–4, preferably air flow selector means 50 is comprised of a plurality of openings 51 that are formed through the cylindrical wall of housing 21 (four openings shown but only one is numbered for clarity). Openings 51 are spaced in an arc and each is adapted to selectively receive a tightly fitting, detent (e.g. push pin 52) or the like. The holes are arrayed so that they follow the pivotal arc of one of the louvers 30 (e.g. louver 30e). The detent 52 extends through a selected opening 51 and into the arcuate path of the louver 30e to limit rotation of that louver once it reaches its selected closed position. Preferably, airflow selector means 50 is positioned on the upper wall 22 of housing 21, beginning just above step 23.

To improve the efficiency of the detent 52 in serving as a stop to control the closure of louvers 30, a detent receiver housing 46 is integrally molded onto top of louver 30e near its end that is adjacent openings 51. Detent receiver housing 46 extends upward substantially perpendicularly from louver 30e and has a recess therein which, in turn, is formed by tapered sides that culminate in a bridge 48 at their tops.

While shown as a plurality of spaced openings 51, selector means may alternately be comprised of a continuous slot 51a (FIG. 7) following the same arcuate path as openings 51 and extending between the same lowermost and uppermost points on the upper wall 22 of housing 21. A detent may be press fitted into the slot 51a at any point thereby providing an "infinite" number of settings along the path. Also, other types of detents, e.g. spring-biased pins, screw pins, etc., may be used to fix the louvers in a selected closed position.

In operation, the amount of air flow (i.e. ventilation) during the colder periods of the year is determined by a user. This may range from about 0% up to about 25%, depending on geographical location in which the damper is to be used. Detent 52 is then inserted into the selected opening 51 or at a selected point along the continuous slot which represents the desired air flow through the damper when in its selected closed position. That is, the lowest point or opening 51 allows minimum winter ventilation i.e. about 0° of the maximum air flow through damper when in the damper is in a fully open position while the uppermost point or opening 51 allows maximum winter ventilation, i.e. about 25% of the maximum air flow through the damper when the damper is in a fully open position. The detent 52 is of such a length to extend through opening 51 and into the recess within detent receiver 46 on louver 30e to thereby block movement of the louvers when they reach the selected closed position.

When the weather cools and coil 40 moves louvers 30 toward their closed position, the detent 52 will engage the sides of pin receiver 46 and ride up therealong until the detent contacts bridge 48 thereby stopping any further rotation of louvers 30 at the selected closed position. As a consequence, this allows only the selected amount of airflow through damper 20 (i.e. winter ventilation) during the colder periods.

Figure 5:
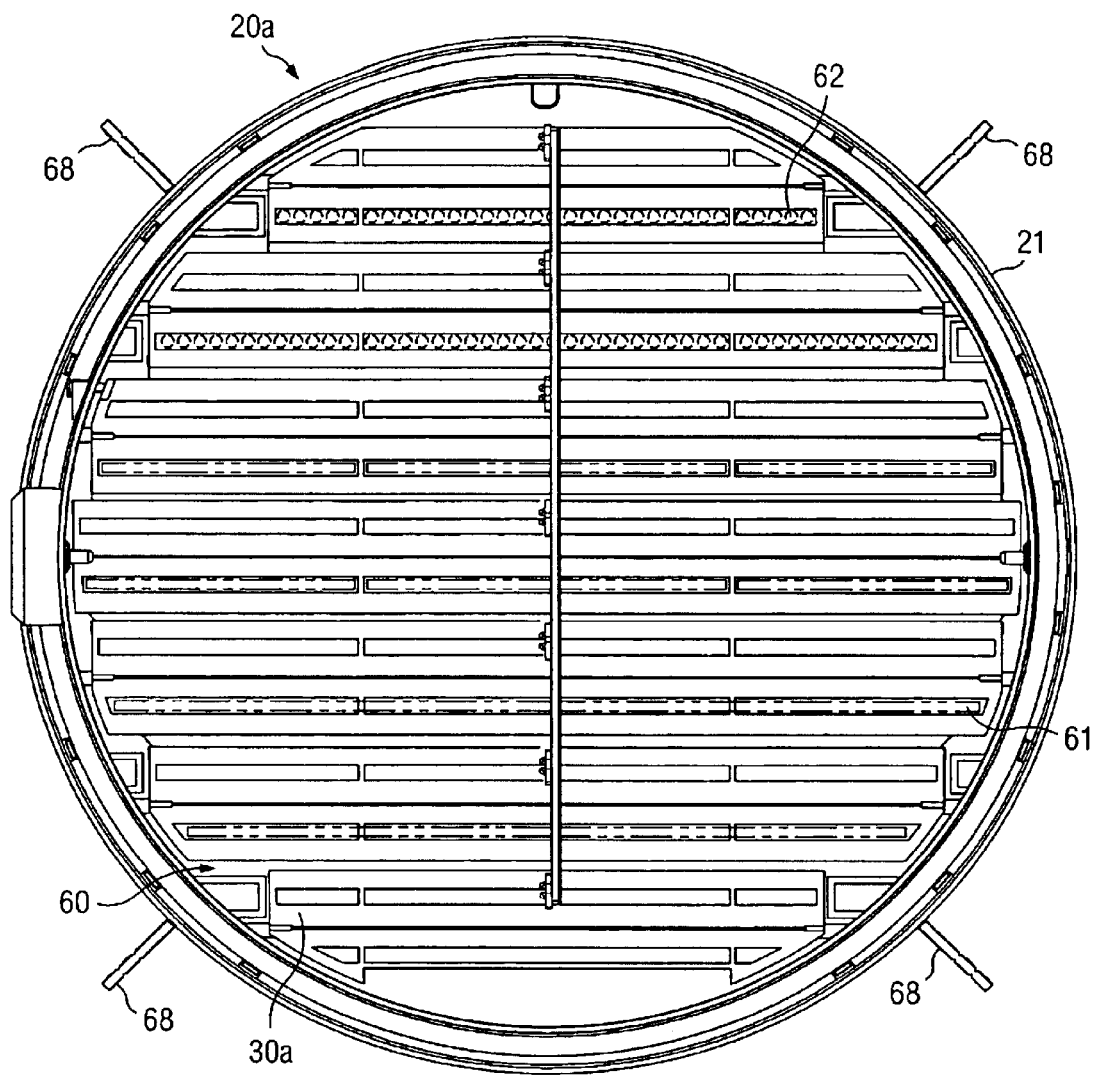
FIG. 5 is a top view of an embodiment of the damper of FIG. 1 illustrating several modifications of the vanes of the damper for controlling the air flow through the damper when the damper is in its fully closed position.
Figure 7:
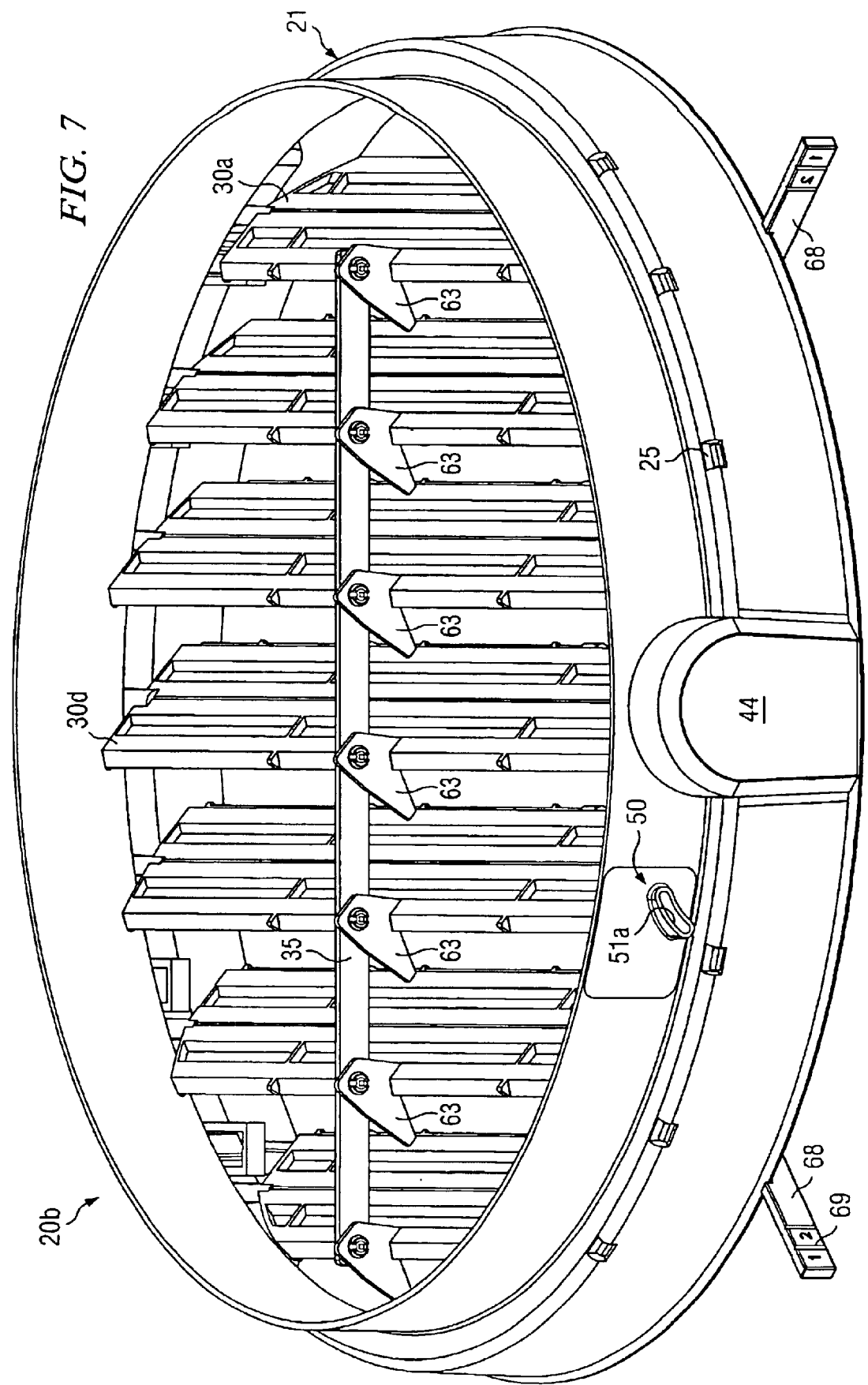
FIG. 7 is a partial, perspective view of a further embodiment of the damper of FIG. 1 wherein interference elements are mounted on the louvers of the damper to prevent the damper from fully closing.

FIGS. 5 and 7 illustrate further embodiments of air flow selector means which can be used to control the air flow through the present damper (i.e. winter ventilation) during colder periods to provide at least some ventilation in an attic or the like while blocking substantial air flow therefrom. FIG. is a top view of a first embodiment of a damper 20A wherein the air selector means 50a is comprised of limited air passages which, in turn, are provided in the louvers, themselves, to thereby allow a selected amount of air flow through the damper when the damper is in a "closed" position. These limited air passages can be provided in a variety of ways.

For example, one of more of the louvers (e.g. only one shown, 30a) can be reduced in width so certain louvers will not overlap but will instead provide a gap 60 between adjacent louvers when they are in a closed position. Further, slots 61 and/or holes 62 can be formed through one or more selected louvers to provide limited passages for air flow. Preferably, these gaps or passages are not provided randomly but are to be accurately sized to allow the desired air flow (from about 5% to about 25%) during the colder periods during which the damper 20A is to be in a closed position.

The air flow selector means 50b damper 20B in FIG. 7 is comprised of interference means which prevent the louver from closing all the way. As illustrated in FIG. 7, the interference means is comprised of stop elements 63 which are attached to one or more of the louvers to prevent them from rotating to a fully closed position. The size of the stop element 63 will determine the amount of airflow through the damper when the louvers are in the selected closed position. Other such interference means (not shown) may comprise stops on the inner wall of housing 21, louvers, or linkage strip 35 that cooperate to stop the louvers in a selected closed position.

Figure 6:
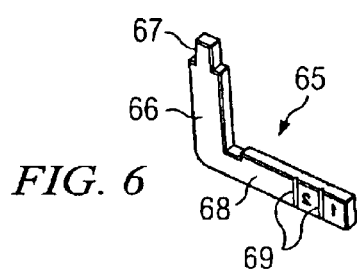
FIG. 6 is an enlarged, perspective view of an extender used to adapted the damper of FIGS. 1 and 5 for installation in larger diameter ventilation conduits.

Housing 21 of the dampers of the present invention is typically designed to fit in the most popular ventilation conduits 13, those being conduits having a 12-inch diameter. However, there are a large number of conduits available and already installed that have diameters up to about 14-inches. To make the present damper more commercially attractive, a plurality (e.g. four) of an adapter 65 (FIG. 6) may be provided with the damper at the time of sale or as an after sale which allows a standard, one-size damper to be used in either a 12-inch or 14-inch ventilation conduit, or variations in between.

Adapter 65 can take various configurations but is preferably an L-shaped element that is formed of molded plastic. The "vertical" leg 66 of adapter 65 has a reduced end 67 which is adapted to "snap" into a corresponding recess (not shown) which, in turn, is molded into the under side of step 23 of housing 21 at the time of manufacture. The "horizontal" leg 68 of adapter 65 then extends outwardly from the bottom of the housing as shown in FIGS. 5 and 7. These legs extend the effective diameter of the damper 20 so that the legs 67 of the adapters will engage shoulder 12a of mounting flange 12 of a 14-inch diameter, ventilation conduit 13 whereby one size damper is adaptable to fit both 12 and 14-inch conduits.

Preferably, four adapters 65 are provided to be positioned at approximately 90° intervals around housing 21. Also, leg 68 of each adapter 65 may have one or more notches 69 spaced along leg 68 at which the outer portion of leg 68 can be broken away to thereby adjust the length of leg 68. This allows some fine tuning when installing damper 20 in conduits having slightly, varying diameters.

What is claimed is:

1. A damper for controlling the air flow through a passage such as a ventilation conduit used in mounting a wind turbine on a roof of a structure, said damper comprising:
   a housing having a cylindrical wall, said housing being adapted to fit within said passage;
   a plurality of louvers pivotably mounted in said housing and being rotatable between an open position and a selected closed position, said louvers blocking at least a portion of the air flow through said damper when in said selected closed position;
   means for moving said louvers between said open position and said selected closed position in response to changes in temperature;
   linkage means for interconnecting said louvers together whereby said louvers are moved in unison between said open position and said selected closed positions; and
   air flow selector means on said damper for adjusting the selected closed position of said louvers to control the amount of air flow through said damper when said louvers are moved to said selected closed position.

2. The damper of claim 1 wherein said damper has a low profile wherein said louvers are of a width whereby no portion of said louvers will extend out of said housing when said louvers are in either said open position or said selected closed position.

3. The damper of claim 1 wherein said linkage means comprises:
   an elongated linkage strip positioned across said louvers; and
   means for pivotably connecting each louver to said linkage strip.

4. The damper of claim 1 wherein said means for moving said louvers between said open position and said selected closed position comprises:
   A bimetallic coil having a first end and a second end.

5. The damper of claim 4 wherein said plurality of said louvers includes a master louver and
   wherein said first end of said bimetallic coil is fixed to said housing and said second end of said bimetallic coil is fixed to said master louver whereby expansion or contraction of said coil rotates said louvers in unison.

6. The damper of claim 5 wherein said air flow selector means comprises:
   an arcuate path through said wall of said housing, each point along said path representing a different, selected closed position of said louvers; and
   a detent adapted to be positioned at a said point along said path, said detent being of a length to extend through said housing and engage one of said louvers to limit further rotation of said louvers toward a closed position when said louvers reach said selected closed position.

7. The damper of claim 5 wherein said air flow selector means comprises:
   a plurality of spaced openings through said wall of said housing, each of said openings representing a different, selected closed position of said louvers; and
   a detent adapted to be positioned within a selected one of said openings, said detent being of a length to extend through said selected opening and engage one of said louvers to limit further rotation of said louvers toward a closed position when said louvers reach said selected closed position.

8. The damper of claim 6 wherein said different, selected closed positions range from about 0% of the maximum air flow through said damper to about 25% of the maximum air flow through said damper.

9. The damper of claim 7 wherein said air flow selector means further comprises:
   a detent receiver fixed on said one of said louvers and adapted to receive said detent to thereby limit rotation of said louvers to said selected closed position.

10. The damper of claim 1 wherein said air flow selector means comprises:
    passages through said louvers for allowing air flow through said damper when said damper is in said selective closed position.

11. The damper of claim 1 wherein said air flow selector means comprises:
    interference means for stopping rotation of said louvers when said louvers reach a said selected closed position.

12. The damper of claim 11 wherein said interference means comprises:
    a stop element attached to at least one of said plurality of louvers to stop rotation of said louvers when said louvers reach said selected closed position.

13. The damper of claim 1 including:
    a plurality of L-shaped adapters, each said adapter having one leg attached to said housing and another leg extending out from the periphery of said housing to thereby adapt said damper for use in larger diameter passages.

14. The damper of claim 1 wherein said housing, said louvers, and said linkage means are all made of molded plastic.

15. A damper for selectively controlling air flow through a passage, said damper comprising:
    a cylindrical, stepped housing made of molded plastic, said housing having an upper wall, a larger-diameter lower wall, and an integral step connecting said walls;
    a plurality of latch slots formed in and radially spaced around said step;
    a pair of arcuate retainers formed of molded plastic, each retainer having a plurality of latches molded thereon which are adapted to be received by respective said slots in said step of said housing to latch said retainers in said housing, each retainer having a plurality of troughs spaced along the upper surface thereon;
    a plurality of louvers of appropriate lengths to selectively fit within said housing, each louver having an axle pin at either end thereof adapted to be pivotably received in a respective said trough in each of said retainers so that when said latches are received into their respective said latch slots within said housing, said louvers are thereby pivotably mounted in said housing and are rotatable between an open and a selected closed position;
    means for moving said louvers between said open position and said selected closed position in response to changes in temperature;
    linkage means for interconnecting said louvers together whereby said louvers are moved in unison between said open position and selected closed positions; and
    air flow selector means on said damper for adjusting the selected closed position of said louvers to control the amount of air flow through said damper when said louvers are moved to said selected closed position.

16. The damper of claim 15 wherein said damper has a low profile in that said louvers are of a width whereby no portion of said louvers will extend out of said housing when said louvers are in either said open position or said closed position.

17. The damper of claim 16 wherein said linkage means comprises:
    an arm molded on each of said louvers and having an opening therethrough;
    an elongated, linkage strip made of molded plastic and positioned across said louvers; and
    a plurality of tapered, split-headed connectors integrally molded at spaced intervals along said linkage strip, the head of each said connector adapted to pass through and latch into said opening in said arm of a respective louver to thereby form a pivotable connection therebetween.

18. The damper of claim 17 wherein said means for moving said louvers between said open position and said closed position comprises:
    a bimetal coil having a first end and a second end.

19. The damper of claim 18 wherein said plurality of said louvers includes a master louver whose said axle pin at one end thereof extends through an opening in said housing and wherein
    said first end of said bimetallic coil is fixed to said housing and said second end of said bimetallic coil is fixed to said one axle pin of said master louver whereby expansion or contraction of said coil rotates said louvers in unison.

20. The damper of claim 19 wherein said air flow selector means comprises:
    a plurality of openings through said upper wall of said housing, each of said openings representing a different, selected closed position of said louvers; and
    a detent adapted to be positioned within a selected one of said openings, said detent being of a length to extend through said selected opening and engage one of said louvers to limit further rotation of said louvers when said louvers reach said selected closed position.

* * * * *